No. 855,980. PATENTED JUNE 4, 1907.
E. J. A. RICE.
GATE.
APPLICATION FILED FEB. 27, 1907.
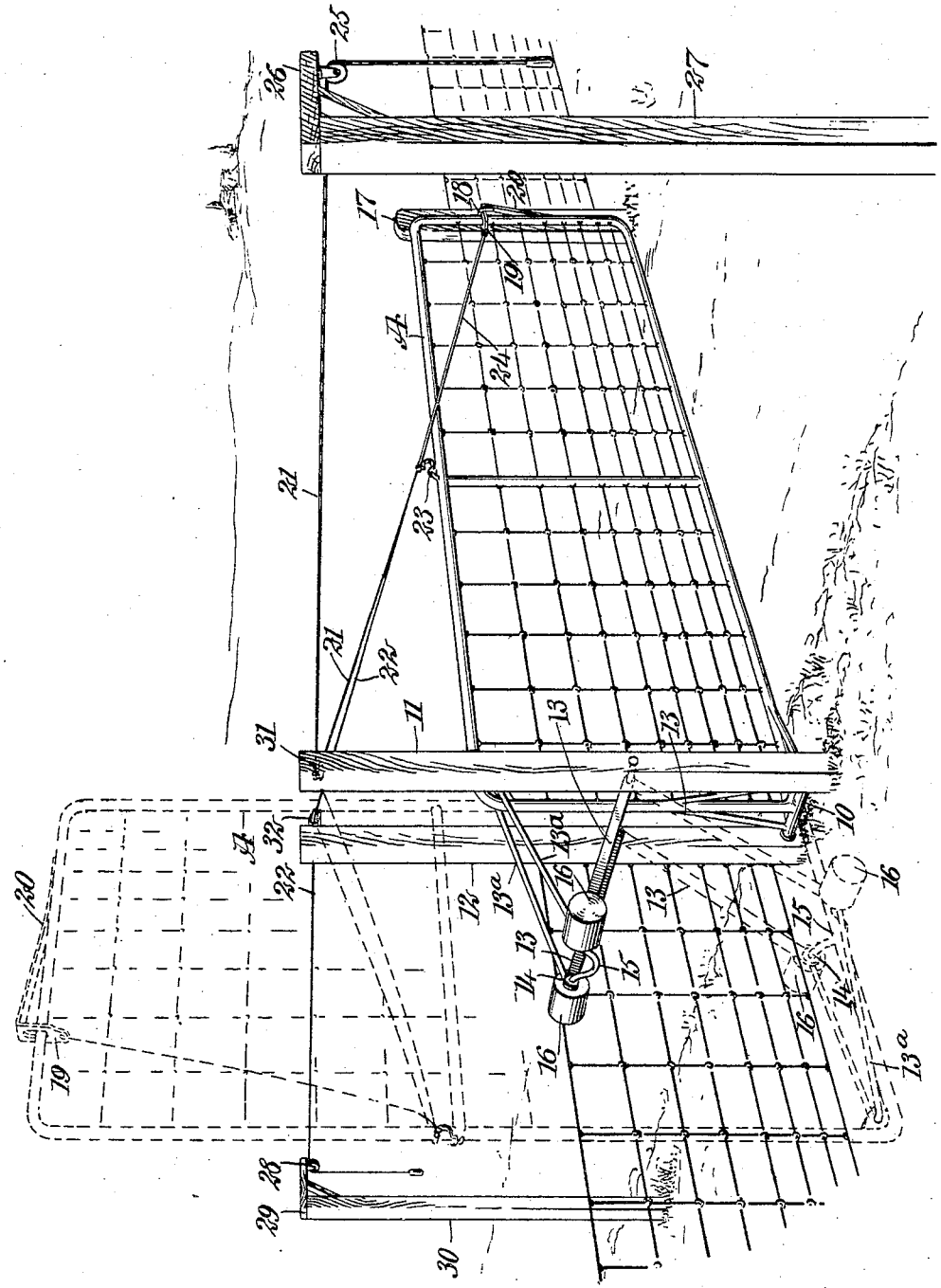
WITNESSES
INVENTOR
Ernest J. A. Rice
BY
ATTORNEYS

UNITED STATES PATENT OFFICE.

ERNEST J. A. RICE, OF HARVARD, NEBRASKA.

GATE.

No. 855,980.      Specification of Letters Patent.      Patented June 4, 1907.

Application filed February 27, 1907. Serial No. 359,651.

*To all whom it may concern:*

Be it known that I, ERNEST J. A. RICE, a citizen of the United States, and a resident of Harvard, in the county of Clay and State of Nebraska, have invented a new and useful Improvement in Gates, of which the following is a full, clear, and exact description.

The purpose of the invention is to provide an improved construction of farm gate, or that class of gates adapted to be opened by a person approaching it and closed by a person after having passed through the gate, no matter whether such person is on foot, mounted, or seated in a vehicle.

It is a further object of the invention to provide a perfectly balanced gate, one that will require a minimum of exertion to open and close it, and one wherein the latch is positive in its action, of smooth construction, and perfectly responsive to the agencies employed in opening and closing the gate.

A further purpose of the invention is to provide means for counterbalancing the gate that will permit the lower end of the gate to rest firmly upon the ground when the gate is in an upright or open position, and which will automatically assume its normal position as the gate is closed.

The invention consists in the novel construction and combination of the several parts as will be hereinafter fully set forth and pointed out in the claims.

Reference is to be had to the accompanying drawing forming a part of this specification, in which the figure is a perspective view of the gate, illustrating it in positive lines in closed position and in dotted lines in open position.

A represents the gate which may be of any approved construction. This gate at its lower rear end or heel section is provided with a trunnion 10, pivoted in parallel uprights 11 and 12, and a short distance below the central portions of the said uprights 11 and 12, links 13 are pivoted, and these links extend rearward a predetermined distance. A shaft 14 is passed through the outer ends of the links 13 and the said shaft 14 at its central portion is provided with a crank section 15, and at each end of the said shaft 14 outside of the links 13, or inside, at option, weights 16 are secured to the shaft. The shaft 14 is connected with the gate A through the medium of a triangular arm 13$^a$ pivotally connected at the junction of its members at its upper rear end or at a point between the uprights 11 and 12 when the gate is in its horizontal or operative position, and the outer ends of the members of the said triangular arm 13$^a$ are provided with eyes through which the shaft 14 passes, the said eyes receiving the said shaft at points adjacent to the links 13.

A keeper post 17 is provided against which the free end of the gate has bearing when the gate is closed, as is shown in full lines in the drawing. This keeper post 17 is provided with a keeper 18 of any approved type adapted when the gate has closed to receive beneath it a link latch 19 that has sliding movement on the upright free member of the gate, as is shown in both positive and dotted lines in the drawing. This latch 19 is connected at its outer end with a spring 20 and the said spring 20 at its lower end is secured to the lower outer free end portion of the gate A, as is also shown in positive and dotted lines in the drawing.

The gate is operated through the medium of two cables 21 and 22. These cables are brought together between the end portions of the gate A and are joined to a short common cable 23 that is attached to the upper central portion of the gate. A wire or a cable 24 is attached to the common cable 23 where it connects with the operative cables 21 and 22 and the said wire or cable 24 is connected with the inner end of latch 19 so that when the operating cables 21 and 22 are brought into action to raise or to lower the gate A, the latch 19 will also be operated. When the gate is raised the latch 19 will be first drawn from its keeper 18 before sufficient tension is brought to bear on the cables 21 and 22 to raise the gate, and when either one of said cables 21 and 22 is operated to lower the gate the latch 19 will automatically engage with its keeper 18.

The weights 16 counterbalance the gate and thus little exertion is necessary to operate the gate in opening or in closing, and owing to the crank section 15 of the shaft carrying the weights and the link connection between said shaft and the uprights 11 and 12, when the gate is opened it assumes the perpendicular position shown in dotted lines in the drawing, and is fully within the uprights 11 and 12, offering no obstruction to the gateway, leaving it fully open from the standards 11 and 12 to the keeper post 17, and as the gate assumes the vertical open position shown in dotted lines the crank section 15 lies flat against the sill of the gateway, as is shown in dotted lines in the drawing, and the rear end of the gate rests upon the said crank section 15 and the weights 16 tend to hold the gate in its open position even in the most windy weather.

The operating cable 21 is passed over a pulley 25 supported by a horizontal arm 26 connected with the post 27 located at one side of the gateway in alinement with the upright 11, while the other operating cable 22 is passed over a pulley 28 supported by a horizontal arm 29 attached to a post 30 at the opposite side of the gateway and in alinement with the upright 12, but before the cables 21 and 22 are passed over the pulleys 25 and 28 they are passed respectively over pulleys 31 and 32 that are attached to the upper front portions of the uprights 11 and 12; and I desire it to be understood that any equivalents of the pulleys 25, 28, 31 and 32 may be employed.

This gate is exceedingly simple in its construction and can be readily operated with a minimum of expenditure of strength, and can be opened or closed from either side.

Having thus described my invention, I claim as new and desire to secure by Letters Patent,—

1. The combination with uprights, a gate pivoted at its lower portion to the said uprights, links connected with the uprights extending rearwardly therefrom, a connection between the said links and the upper rear portion of the gate, a weight at the rear ends of the links, and means for opening and closing the gate from either side thereof.

2. Uprights, a gate pivoted at its lower portion to the said uprights, links connected with the uprights extending rearwardly therefrom, a connecting medium between the said links and the upper rear portion of the gate, a shaft carried by said medium and said links, a weight at each end of the said shaft, and means for opening and closing the gate from either side thereof.

3. The combination with uprights, a keeper post, a gate pivoted at the lower rear end portion between the said uprights, rearwardly extending links pivotally attached to the said uprights, a shaft passed through the outer end of the said links, a weight at each end of the shaft, and an angular arm pivotally connected with the said shaft and with the upper rear portion of the gate, of a keeper on a keeper post, a sliding latch carried by the gate for engagement with the said keeper, cables having guided support and extending in opposite directions from the upper central portion of the gate whereby to raise and lower the same from either side, and an auxiliary cable connected with the said operating cables and with the said latch for the purpose of withdrawing the latch from the keeper when the gate is elevated.

4. The combination with parallel uprights, a gate the rear end of which is located between the said uprights, the lower rear portion of the gate being pivoted to said uprights, links extending rearwardly from the said uprights, a shaft loosely passed through the said links and provided with a central crank section, a weight at each end of the shaft, a triangular arm the members whereof are pivotally received by the said shaft, the said arm at the junction of its members being pivotally attached to the upper rear portion of the gate, of a keeper post, a keeper attached thereto, a sliding latch carried by the gate for engagement with the keeper, a spring normally tending to hold the latch in position to engage the said keeper, operating cables connected with the upper central portion of the gate, and an auxiliary cable connected with the operating cables and with the said latch for the purpose described.

In testimony whereof I have signed my name to this specification in the presence of two subscribing witnesses.

ERNEST J. A. RICE.

Witnesses:
V. A. DAY,
WILLIAM T. JOHNSON.